Figure 1:
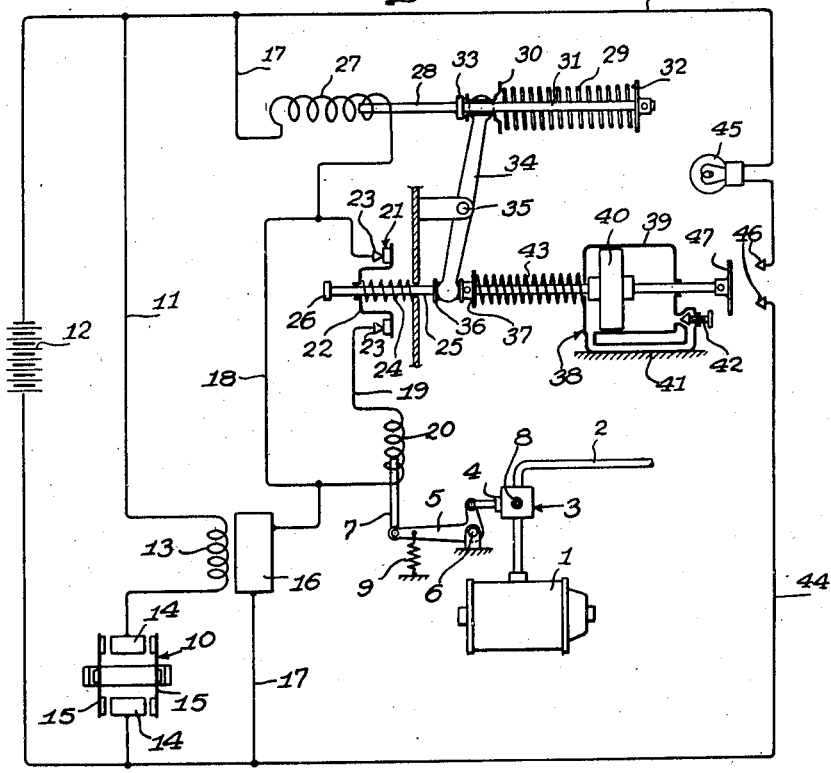

Aug. 26, 1947.  C. L. EKSERGIAN  2,426,575
BRAKE CONTROL DEVICE
Filed Aug. 31, 1944

INVENTOR.
Carolus L. Eksergian
BY John P. Tarbox
ATTORNEY

Patented Aug. 26, 1947

2,426,575

UNITED STATES PATENT OFFICE 2,426,575

BRAKE CONTROL DEVICE

Carolus L. Eksergian, Detroit, Mich., assignor to The Budd Company, Philadelphia, Pa., a corporation of Pennsylvania Application August 31, 1944, Serial No. 552,039

4 Claims. (Cl. 188—181)

The invention relates to a brake control device for preventing wheel slide, of the general class disclosed in Patent No. 2,365,180 for Brake control means granted December 19, 1944, and more particularly to a safety device for use therewith.

In brake control devices of this class there exists, independent of the operator's control of the fluid pressure in the brake cylinder applying the brakes to a wheel or wheels to effect the braking, a valve for releasing braking pressure from the cylinder. If the wheel decelerates at a rate exceeding any normal deceleration thereof due to braking, i. e., at such a deceleration rate as takes place when the wheel starts to slip, this valve is promptly operated to release the pressure in the cylinder and cut off the operator's control, immediately upon commencement of wheel slip, so as to permit the wheel to cease decelerating and accelerate back to normal speed. It has been found that from the start of slipping to the time the wheel has returned to normal or vehicle speed takes a time of approximately one second.

Ordinarily, and as shown in the above referred to patent, a device responsive to changes in wheel speed and particularly to the abnormal deceleration rate incident to wheel slip, such as an inertia-operated switch, is arranged to close a primary circuit, which in turn closes a relay circuit for operating the valve to release the brake cylinder pressure. Preferably this relay circuit when closed is held closed by a delay action device to allow the wheel to return to normal or vehicle speed before the valve is returned to its normal position.

With such an arrangement, wheel slide is automatically prevented independent of the pressure in the brake cylinder called for by the operator. However, it may happen, under conditions of operation, that one or the other of the control circuits in the automatic control may become short-circuited, in which case the release valve would be held open an undesired length of time and during such time the control of the brakes operated by the brake cylinder would be removed from the operator. This is obviously undesirable.

It is an object of the invention to provide a safety device which will return the brakes to the control of the operator a predetermined time after such short circuit occurs, and this may be accomplished by cutting out the wheel slide control and thereby restoring the release valve to its normal position.

Of course, while such short circuit persists, the brakes may be controlled solely by the operator's control during the time the wheel slide control is cut out.

Since it is obviously desirable to afford the wheels the protection of the wheel slide control as soon as possible, it is a further object of the invention to provide a reset device which again returns the wheel slide control to operative condition. Such reset may be automatic, if the conditions which brought about the short circuit are remedied, or it may be manually operated, as desired.

It is also desirable to provide a signal at the time the cut-out is operated to show the operator the condition of the brake control, and it is a further object of the invention to provide such signal where it can be readily noticed by the operator to indicate to him the fact that the wheel slide control has been cut-out and the brake controlled thereby is again under his full control.

These and other objects and advantages and the manner in which they are attained will become apparent from the following detailed description of the embodiment of the invention selected for illustration.

Figure 2:
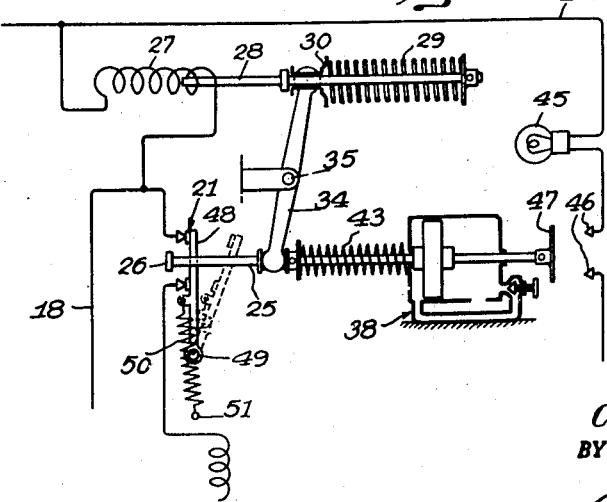

In the drawings:

Fig. 1 is a diagrammatic view showing the application of the invention to the control circuits of a wheel slide detector and a brake cylinder controlled thereby, the reset being shown in this figure to be automatic in operation, and Fig. 2 is a diagrammatic view corresponding to the reset portion of Fig. 1 showing a manual reset replacing the automatic reset of that figure.

Referring to the drawings, the brake cylinder subject to the control is designated by numeral 1. This cylinder may control the brakes associated with a single wheel or with a pair of wheels rotating with an axle in any conventional manner. Fluid pressure is admitted to the cylinder under the operator's control in any conventional manner through the pipe 2. A two-way valve 3 in the pipe 2 has a piston 4 which, in the position shown, places the pipe 2 into communication with the cylinder. The piston is actuated by a bell-crank lever 5 pivoted on a fixed pivot at 6 and having its short arm pivotally connected to the piston and its long arm, to an armature or core 7.

When the valve piston 4 is moved to a second position, by the means to be described hereinafter, it cuts off the operator's control pipe 2 from the cylinder and places the cylinder in communication with the exhaust port 8, thereby rapidly venting the compressed fluid from the cylinder to release the brakes controlled thereby. The lever 5 may be returned to the position shown in Fig. 1 either by gravity or by a light spring 9, as shown.

The valve 3 is automatically controlled by the wheel slide control now to be described.

This control comprises an inertia-operated switch designated generally by 10 and arranged to close a primary circuit 11 having a battery 12, a solenoid or magnet 13, and spaced switch contacts 14 arranged in series. The inertia-switch is responsive to abnormal wheel deceleration or acceleration, such as occurs upon wheel slip, and is automatically closed in response thereto through either of the contact bars 15 bridging the contacts 14.

Immediately upon the closing of the switch 10 the magnet 13 is energized to operate a known type of mercury switch, generally designated 16, to close a secondary or relay circuit 17 in series with the battery 12. This relay circuit has two parallel branches 18 and 19 in the latter of which is inserted the solenoid 20 which, through the armature 7 immediately operates the valve 3 to cut out the operator's control pipe 2 and release fluid pressure from the brake cylinder 1.

To hold the valve 3 open a sufficient length of time to permit the slipping wheel to stop slipping and return to substantially normal or vehicle speed, there is a time lag in the opening of the mercury switch 16 sufficient to permit such return.

The device so far described is similar to the device disclosed in the above-identified patent and operates in similar manner to prevent wheel slide by promptly releasing fluid pressure from the brake cylinder and continuing such release until the slipping wheel has returned to substantially normal or vehicle speed.

If for some reason a short-circuit should take place in either the primary or secondary circuits 11 or 17, the valve 3 would be held open continuously as long as the short circuit persisted, and the operator's control of the brakes would thus be destroyed. To enable the operator to resume control if the short circuit persists for a sufficient time, the invention contemplates the provision of a safety device for cutting-out the wheel slip control after a predetermined time, say 10 seconds, and thereby return the control to the operator.

This safety device may comprise a normally closed cut-out switch designated generally by 21 disposed in the branch 19 of the relay circuit, the switch thus being in series with the armature 20 controlling the valve 3. This switch may comprise a sliding contactor 22 bridging the spaced contact points 23. The contactor 22 is pressed against the points 23 by a light coil spring 24 surrounding a switch operating rod 25 extending loosely through an opening in the contactor and having a head 26 normally spaced some distance outwardly, i. e. to the left, of the contactor.

When the rod 25 is moved to the right, as shown in Fig. 1, the head 26 engages the contactor 22 to move it away from the points 23, thereby opening the cut-out switch and deenergizing the solenoid 20 and permitting the valve 3 to be moved to the position shown closing the exhaust 8 and connecting the operator's control line 2 to the cylinder 1.

The movement of the rod 25 is controlled to cause a predetermined time lag, say 10 seconds, to elapse between the time it is first actuated and the time the head 26 strikes the contactor 22 to open the cut-out switch.

The means for actuating the rod 25 to the right may comprise a solenoid 27 in the secondary circuit, which is energized at all times when the secondary circuit is closed, either through the branch 18 or the branch 19, or both. The energization of this solenoid moves an associated armature or core 28 to the left. An extension 31 of the core 28 carries a coil spring 29 between a movable sleeve abutment 30 slidable on the extension 31 and an abutment 32 affixed to the right-hand end of this extension. A fixed abutment 33 on the armature 28 limits the movement of said armature to the right under the action of the spring 29 and may hold the spring normally, i. e. when the solenoid is deenergized, under slight compression.

A double-armed lever 34 pivoted on a fixed pivot at 35 has one arm connected to the movable abutment 30 and the other arm disposed between fixed abutments 36 and 37 on the rod 25.

As soon as the solenoid 27 is energized, it moves the armature 28 to the left compressing the spring 29 which acts through the movable abutment 30 to swing the lever 34 about its pivot and exert pressure on the abutment 37 of the rod 25 to move it to the right. Such movement is resisted by a dash pot, as 38, comprising a closed casing 39 having a piston 40, fixed to the rod 25 extending through the casing, movable therein. The dash pot casing is filled with a fluid and operates in the usual way to slow up the movement of the rod by forcing the fluid from one side of the piston to the other through a by-pass 41, the rate of flow being controlled by an adjustable needle valve 42. In addition to overcoming the action of the dash pot, the spring 29 must also overcome the action of a return spring 43 disposed between the dash pot and the abutment 37 on the rod 25. To this end the spring 29 must be sufficiently more powerful than the return spring, not only to overcome it, but also to overcome the frictional resistance of the dash pot and the slight resistance of the light spring 24.

From the foregoing description it will be evident that the time lag between the energization of the solenoid 27 and the opening of the cut-out switch 21 depends on the adjustment of the dash pot 38. Such time lag may be in the neighborhood of ten seconds to insure no operation of the cut-out switch 21 if the wheel slip control circuits 11 and 17 are functioning normally.

It is desirable to provide the dash pot piston with a one-way valve (not shown) to permit the quick return of the rod 25 by the return spring 43.

The device thus provides an automatic reset of the cut-out switch immediately the conditions in the secondary or relay circuit 17, 18, 19 are normal.

To provide for a visual indication to the operator when the cut-out switch is open, a third circuit 44, including the battery 12 and an electric lamp 45 disposed in the operator's cab is provided, this circuit being normally open at the spaced switch points 46 but arranged to be closed by a contactor 47 on the end of the rod 25 projecting from the right hand end of the dash pot, when the rod is moved to its position opening the cut-out switch 21.

The operation of the device having been made clear by the foregoing detailed description—further description of the operation is believed to be unnecessary.

In the modification shown in Fig. 2 like parts are referred to by corresponding reference numerals. In this modification, the cut-out switch, again referred to generally by the reference numeral 21, comprises a pivoted contactor 48 pivoted at a fixed point 49, and a spring 50 is connected to it and to a remote fixed point 51 in such manner that it passes on opposite sides of the pivot point 49 when the contactor is moved from closed to open position or vice versa. So arranged, the spring holds the switch contactor in either the open position shown in dotted lines or in the closed position shown in full lines. As soon as the spring passes the pivot 49 it throws the contactor to the extreme position in one direction of movement and holds it in that position. When it is once thrown to the open position by the cut-out device it is retained in that position until it is manually reset to the closed position. The lamp 45 in this modification serves the same purpose as in the preferred form.

From the foregoing description it will be seen that a very simple safety device has been provided in conjunction with the wheel slide control which avoids the danger of losing the manual operator's control of the brakes if the wheel slide control for any reason holds the valve controlled thereby open for a predetermined time longer than the normal time controlled by the delayed action mercury switch 16. At the same time a simple manual or automatic reset device has been provided to return the wheel slide control to operative condition, when the abnormal condition thereof has been rectified. Also simultaneously with the cut-out of the wheel slide control, the operator is notified that his manual control of the brakes has been restored and the wheel slide control cut out.

While a specific form of the device and several specific modifications of one of the features of the device have herein been described in detail, it will be understood that changes and modifications may be made by those skilled in the art from the specific form shown and described without departing from the main features of the invention, and such changes and modifications are intended to be covered in the appended claims.

What is claimed is:

1. In a brake control device for vehicles, a brake cylinder having means for supplying it with pressure fluid under an operator's control for applying brakes to a wheel, means responsive, at all vehicle speeds, to wheel slip for modifying the operator's control and releasing pressure from said brake cylinder and maintaining said pressure release for a normal time sufficient to allow the wheel to return substantially to normal or vehicle speed after slipping and thereupon restoring the operator's control, and safety means operative, in the event that the pressure release is maintained an abnormal time with attendant failure of restoration of the operator's control after the expiration of said normal time, after a predetermined time appreciably longer than said normal release time, for cutting out said pressure release means and restoring the brake cylinder to the operator's control.

2. In a brake control device for vehicles, a brake cylinder having means for supplying it with pressure fluid under an operator's control for applying brakes to a wheel, means responsive, at all vehicle speeds, to wheel slip for cutting out the operator's control and releasing pressure from the brake cylinder and maintaining said pressure release for a normal time sufficient to allow the wheel to return substantially to normal or vehicle speed after slipping, safety means operative only, in the event that the pressure release is maintained an abnormal time with attendant failure of restoration of the operator's control after the expiration of said normal time, after a predetermined time substantially longer than said normal time for cutting out said wheel slip responsive means and restoring the brake cylinder to the operator's control, and means for thereafter, independently of the movement of the vehicle, automatically restoring the said wheel slip responsive means to its normal control if the conditions which brought about the maintenance of the pressure release for said abnormal time have been corrected.

3. In a brake control device for vehicles, a brake cylinder having means for supplying it with pressure fluid under an operator's control for applying brakes to a wheel, means responsive, at all vehicle speeds, to wheel slip for releasing pressure from said brake cylinder and maintaining said release for a normal time sufficient to allow the wheel to return substantially to its normal or vehicle speed after slipping and thereupon restoring the operator's control, safety means, in the event said pressure release means remains effective for an abnormal time and thereby prevents restoration of the operator's control after the expiration of said normal time, operative after a predetermined time many times longer than said normal release time, for cutting out said wheel slip responsive means and restoring the brake cylinder to the operator's control, and means for thereafter, independently of the movement of the vehicle, restoring said wheel slip responsive means to its normal control after the conditions which brought about said abnormal time effectiveness of said pressure release means have been corrected.

4. In a brake control device for vehicles, brake actuating means under an operator's control for applying brakes to a wheel, means responsive, at all vehicle speeds, to wheel slip for modifying the operator's control and reducing the braking effect of said actuating means and maintaining said reduced braking effect for a normal time sufficient to allow the wheel to return substantially to normal or vehicle speed after slipping and thereupon fully restoring the operator's control, safety means operative, in the event the reduced braking effect is maintained an abnormal time with attendant failure of restoration of the operator's control after the expiration of said normal time, after the lapse of a predetermined time substantially longer than said normal time, for cutting out the wheel slip responsive means and restoring the brakes fully to the operator's control, and means for thereafter, independently of the movement of the vehicle, automatically restoring said wheel slip responsive means to its normal control if the conditions which brought about the maintenance of the lessened braking effect for said abnormal time have been corrected.

CAROLUS L. EKSERGIAN.

REFERENCES CITED

The following references are of record in the file of this patent:

UNITED STATES PATENTS

| Number | Name | Date |
|---|---|---|
| 1,982,354 | Rowley | Nov. 27, 1934 |
| 2,068,370 | Bush | Jan. 19, 1937 |
| 2,145,567 | Cotter | Jan. 31, 1939 |
| 2,155,758 | Hinde | Apr. 25, 1939 |